Sept. 6, 1966  D. FLOESSEL ETAL  3,271,003
BLAST VALVE STRUCTURE FOR AN ELECTRICAL CIRCUIT BREAKER
Filed Oct. 28, 1963  2 Sheets-Sheet 2
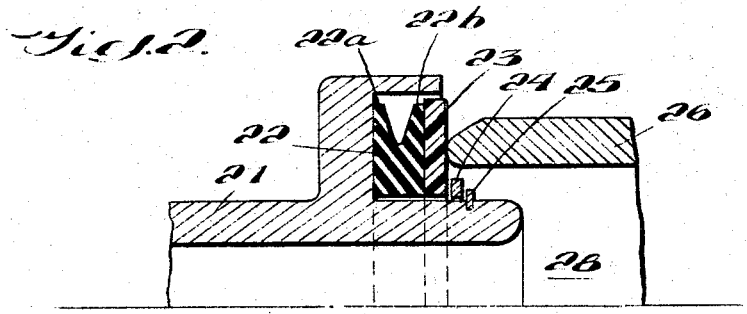
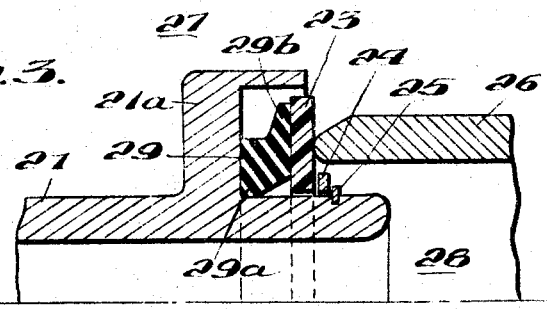
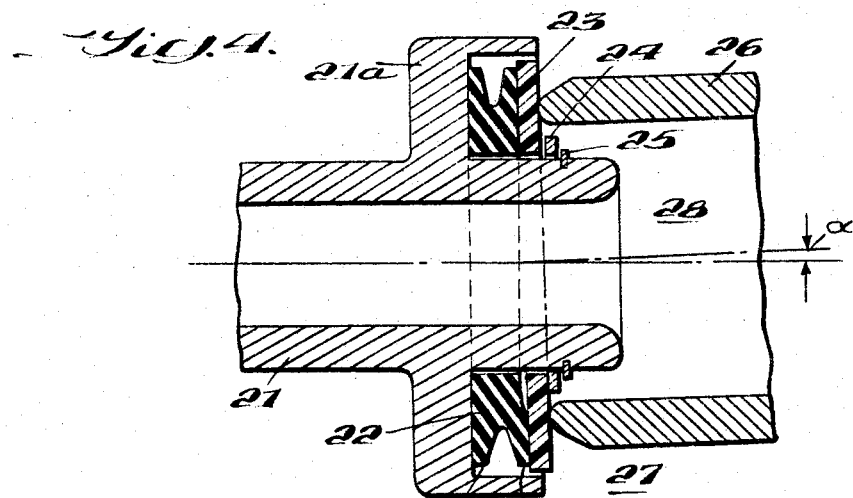
INVENTORS
Dieter Floessel
Gerhard Mauthe
BY Pierce, Scheffler & Parker
ATTORNEYS

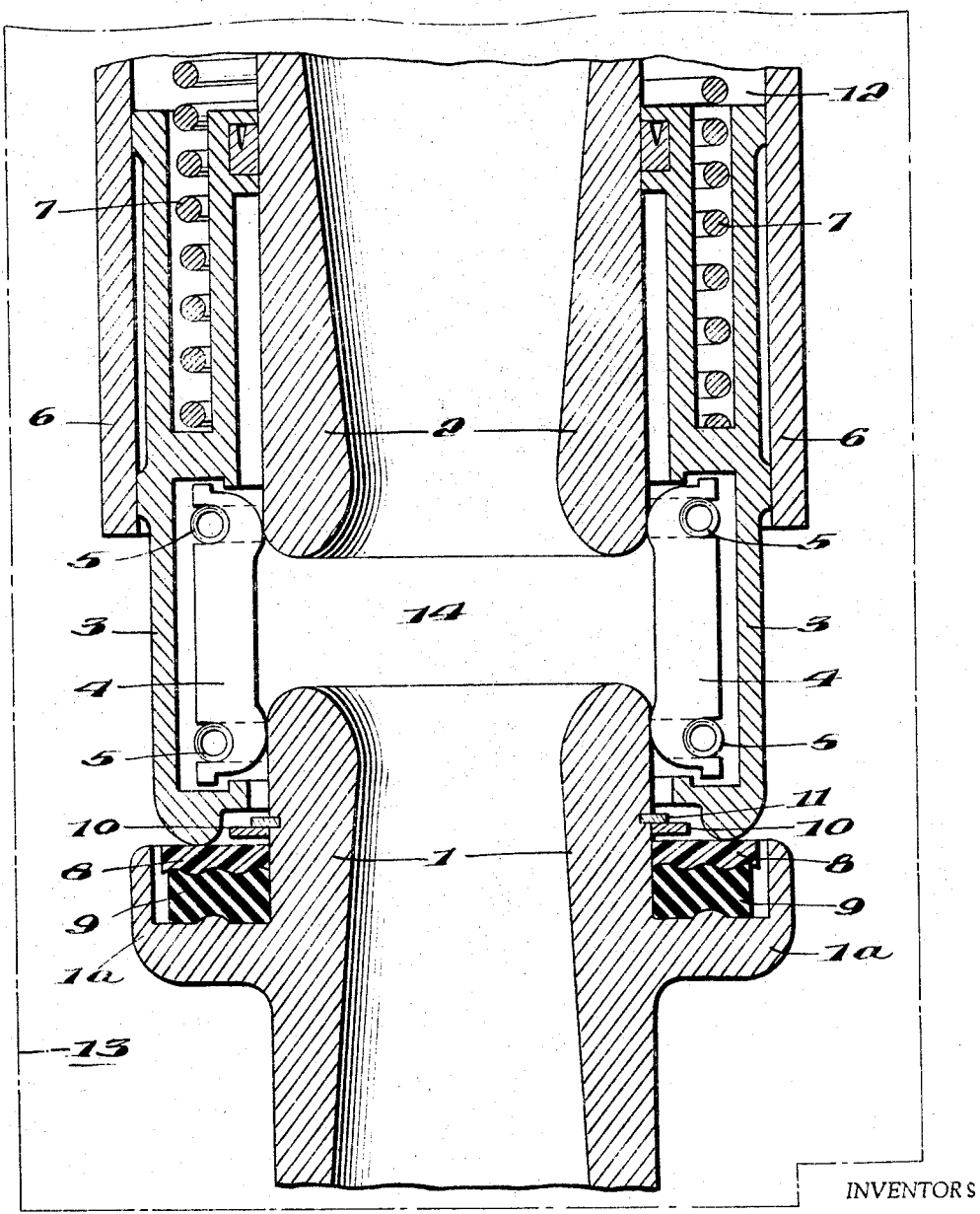

United States Patent Office 3,271,003
Patented Sept. 6, 1966

3,271,003
BLAST VALVE STRUCTURE FOR AN ELECTRICAL CIRCUIT BREAKER
Dieter Floessel, Fislisbach, and Gerhard Mauthe, Baden, Switzerland, assignors to Aktiengesellschaft Brown, Boveri & Cie, Baden, Switzerland, a joint-stock company
Filed Oct. 28, 1963, Ser. No. 319,323
Claims priority, application Switzerland, Dec. 21, 1962, 15,069/62; Feb. 9, 1963, 1,593/63
4 Claims. (Cl. 251—363)

This invention relates to sealing means for a valve, particularly for the blast valve located in direct proximity with the main arcing contacts of a pneumatic circuit breaker. In valves for pneumatic electric circuit breakers it is a matter of major importance that seal should be absolutely tight. Soft rubber seals have generally proved to be satisfactory. However, it has been found that soft rubber alone will not stand up to every operational condition which may arise in a pneumatic circuit breaker. This applies particularly to blast valves which are frequently operated for releasing the blast of compressed gas required for quenching the arc, and which are subjected to high mechanical impact stresses when they rapidly close. In closed position the seal is subjected to the permanent sealing thrust of the movable valve element which is loaded by the gas pressure or by a spring. In course of time the soft rubber seal tends to change its shape and to flow away. For overcoming this difficulty it has already been proposed to use an arrangement for creating the seal, which consists of the combination of a metal and a soft rubber valve seat in such manner that the permanent sealing load on the valve element, particularly the pressure of the compressed gas, will be supported by the metal seat, whereas the seal itself is formed by the soft rubber. To this end a circular groove is machined into the metallic valve seat for the reception of the soft rubber sealing ring, the latter projecting slightly from the face of the metal. When the valve is closed the metallic valve seat bears tightly against a cooperating inelastic countersurface and the compressed soft rubber ring can form the tight seal. In other words the contact surface of the soft rubber ring and that of the metallic seat function in parallel. If such an arrangement is used in a blast valve located in the closest possible proximity with the break between the arcing contacts of the pneumatic circuit breaker, that is to say if the stationary valve seat is located directly adjacent the arcing contacts, whereas the movable valve seat forms part of the movable contact, then considerable difficulties arise which spring from the presence of unavoidable manufacturing tolerations. Owing to the insulating distances required in the circuit breaker chamber the main contact members must, to some extent, be freely supported. This may result in the axes of the main contacts being angularly slightly misaligned so that the movable valve seat will then make slightly one-sided contact with the cooperating seating surface. One side of the contacting surfaces of the valve will therefore be subjected to excessive wear and the life of the valve shortened. On the other hand, there is also some risk of leakage occurring where the soft rubber seal is not under sufficient pressure, and there may then be a permanent escape and loss of gas.

The arrangement according to the invention seeks to overcome this difficulty. To this end the invention proposes to construct the sealing element of two superimposed sealing discs of which the disc which in closing position makes contact with the movable valve member is a hard seal, whereas the other which bears on the member supporting the seal is a soft seal. The result of this arrangement is that the force of the impact at the point where the movable valve member strikes the cooperating surface affects only the hard seal resting with the whole of its underside on the soft seal underneath which is therefore called upon to sustain much lower specific surface loads. Should the axis of the movable valve member be angularly misaligned the seal is then able to accommodate itself to the slightly skew position, because the soft sealing disc, in virtue of its resilience within limits permits the hard disc to cant.

Embodiments of the invention are illustratively shown in the accompanying drawings by reference to which the principle underlying the present invention will now be described. In the drawings FIG. 1 is a view in diametral section showing the arrangement of the seal for a blast valve located in direct proximity with the arcing contacts of a pneumatic circuit breaker.

FIGS. 2 and 3 are alternative forms of construction of the seal, whereas

FIG. 4 illustrates the manner in which the arrangement according to FIG. 2 functions when the axis of the movable valve member is angularly slightly misaligned.

In FIG. 1 the stationary nozzle-shaped arcing contacts of the pneumatic circuit breaker are marked 1 and 2. The movable contact has the form of a tulip-shaped bridging member which in conventional manner comprises a plurality of contact fingers 4 of which the two diametrally opposite each other are shown in the drawing. Contact pressure in the illustrated closed position is provided by annular springs 5. The contact fingers 4 are contained in a tubular member 3 which simultaneously functions as the movable valve member. The bottom end of the tubular member 3 forms a valve seat which is urged by a closing spring 7 into contact with a valve disc 8 made of a hard sealing material supported by a second valve disc 9 made of a soft sealing material. The sealing element composed of the two discs 8 and 9 is seated in a recessed collar-shaped flange 1a surrounding arcing contact 1 which functions as a non-yielding back-up surface for the composite sealing discs 8, 9 and the discs are held in position by a retaining washer 10 located by a spring ring 11. The upper end of the tubular member 3 is piston-shaped and works in a guiding cylinder 6.

For rupturing the current and hence for opening the blast valve the chamber 12 above the tubular member 3 is evacuated in a manner that is well understood, so that the tubular member is pushed upwards by the gas pressure permanently maintained in switch chamber 13 and compresses the closing spring 7. The structural details of switch chamber 13 do not per se form any part of the present invention and hence chamber 13 has been indicated in FIG. 1 only in schematic form by means of the dash-dot enclosure. The compressed gas enters through the annular gap 14 which is thus uncovered between the stationary arcing contacts 1 and 2 and blows into the ambient atmosphere through the interior of the two arcing contacts 1 and 2, quenching the arc drawn between the two arcing contacts. For closing the breaker and the blast valve, chamber 12 is again filled with compressed gas, so that the energy of the compressed closing spring 7 can thrust the tubular member 3 back into its illustrated bottom position. If, owing to slight tolerational angular misalignment of the axis of the tubular member 3 in relation to the axis of arcing contact 1 the circumference of the tubular member fails to strike the whole of the circumferential face of sealing disc 8 simultaneously, the latter can at once adjust itself to the slight cant of the tubular member 3 because of the resilience of the sealing disc 9 which supports it. Unlike the relatively small contacting surface between the tubular member 3 and sealing disc 8 which can sustain the resultant relatively high specific surface pressure because of its hardness, the contacting surface between the two sealing discs 8 and 9 is many times larger, so that the sealing disc 9 consisting of a soft material will be subjected to a correspondingly low specific surface pressure, a circumstance which has a very favourable effect upon the length of the life of the seal.

If such seals are used in pneumatic compressed gas high-capacity outdoor circuit breakers then the sealing elements must be capable of functioning reliably at temperatures down to say −55° C. On the other hand, owing to their proximity with the arcing contacts, they are exposed to relatively high temperatures either during short period current surges or by the electric arc itself. According to another feature of the invention it is therefore proposed to use polytetrafluoroethylene as a material for making the hard seal and silicone rubber as a material for the soft seal. These materials ensure the reliable functioning of the seal and hence of the blast valve within a wide range of temperatures.

For improving the mechanical strength of the hard seal it may sometimes be advisable to reinforce the polytetrafluoroethylene with glass fibres which are embedded therein.

With reference to its ability to admit major angular misalignment of the axis of the movable valve member without impairment of the reliability of the seal the arrangement can be even further improved by providing the soft seal with two sealing lips of which one is pressed by the sealed medium against the hard seal and the other against the surface which carries the seals.

In FIG. 2 the fixed nozzle-shaped arcing member which carries the soft sealing disc 22 and the hard sealing disc 23 in a recessed collar 21a is marked 2, the two seals being held in position by a retaining ring 24 and a spring ring 25. 26 is the tubular movable member of the blast valve. The valve is shown in the drawing when closed, the chamber 27 surrounding members 21 and 26 being filled with a pressurized gas, whereas the interior 28 of members 21 and 26 communicates with the outside atmosphere. The soft seal 22 is formed with a peripheral V-section groove forming two sealing lips 22a and 22b. The gas pressure in chamber 27 presses sealing lip 22a substantially in the axial direction against a flat surface in the recessed collar 21a, whereas sealing lip 22b is pressed into contact with the flat surface on the underside of the hard seal 23. This arrangement further increases the sealing forces produced by the movable valve member 26.

FIG. 3 illustrates a different embodiment in which the soft seal 29 is so constructed that the sealing lip 29a which is urged by the compressed gas against the surface carrying the seals provides a sealing joint substantially with the inside cylindrical surface of the recess in collar 21a.

FIG. 4 illustrates the manner in which the arrangement according to FIG. 2 is capable of adapting itself even to a considerable degree of angular misalignment (angle α) between the axes of the movable valve member 26 and of the arcing contact member 21 carrying the seals. Whereas the sealing lips in the upper half on FIG. 4 are pressed more closely together sealing lip 22b on the opposite side is maintained by the gas pressure acting thereon in sealing contact with the lifted side of the hard seal 23, thus ensuring the production of a tight seal for the blast valve even in cases of pronounced angular misalignment, this being due to the ability of the sealing lip 22b to adapt itself to any slight canting displacement of the hard seal 23.

We claim:
1. In a combined pneumatic circuit breaker and blast valve structure the combination comprising a gas-pressurized chamber within which is located a stationary tubular contact member and a tubular movable contact structure coaxial with said stationary tubular member and adapted for movement longitudinally of itself into and out of engagement with said stationary tubular contact member, and a blast valve sealing off communication between said chamber and the interior of said stationary tubular contact member when said contact members are engaged, said blast valve including a tubular valve member forming part of said movable contact structure and the end face of which serves as a movable valve seat arranged to strike against a stationary annular sealing means surrounding and supported by a lateral surface on said stationary tubular contact member, said sealing means being constituted by two annular superimposed hard and soft sealing discs, said hard sealing disc being strikable by the end face of said movable tubular valve member to effect a closing of said blast valve and being made from polytetrafluoroethylene reinforced with glass fibres and said soft disc being made from a silicone rubber.

2. A combined pneumatic circuit breaker and blast valve structure as defined in claim 1 wherein said soft sealing disc includes a pair of radially extending sealing lips pressed respectively by the pressurized gas against the adjacent face of the hard sealing disc and against said lateral disc supporting surface on said stationary tubular contact member, said sealing lips serving to facilitate adjustment of said soft sealing disc in compensation for any axial mis-alignment whch may exist as between said stationary and movable contact structures.

3. A combined pneumatic circuit breaker and blast valve structure as defined in claim 2 wherein said sealing lip which is pressed against said lateral disc supporting surface of said stationary tubular contact member has a flat surface.

4. A combined pneumatic circuit breaker and blast valve structure as defined in claim 2 wherein said sealing lip which is pressed against said lateral disc supporting surface of said stationary tubular contact member has a cylindrical surface.

References Cited by the Examiner
UNITED STATES PATENTS

| | | | |
|---|---|---|---|
| 2,305,809 | 12/1942 | Maisch | 285—100 |
| 2,815,973 | 12/1957 | Jackson | 277—188 |
| 2,839,316 | 6/1958 | Kasper | 285—7 |
| 2,962,096 | 11/1960 | Knox. | |
| 3,023,030 | 2/1962 | Torres. | |
| 3,049,385 | 8/1962 | Smith | 277—188 X |

M. CARY NELSON, *Primary Examiner.*

H. T. KLINKSIEK, *Assistant Examiner.*